(12) United States Patent
Shih

(10) Patent No.: US 8,522,826 B1
(45) Date of Patent: Sep. 3, 2013

(54) ISOLATION DEVICE FOR OIL CIRCUIT

(71) Applicant: Chun-Chuan Shih, Taichung (TW)

(72) Inventor: Chun-Chuan Shih, Taichung (TW)

( * ) Notice: Subject to any disclaimer, the term of this patent is extended or adjusted under 35 U.S.C. 154(b) by 0 days.

(21) Appl. No.: 13/646,948

(22) Filed: Oct. 8, 2012

(51) Int. Cl.
*F16L 55/10* (2006.01)

(52) U.S. Cl.
USPC .................................. 138/89; 138/90; 24/327

(58) Field of Classification Search
USPC ................................. 138/89, 90; 24/327, 505
See application file for complete search history.

(56) References Cited

U.S. PATENT DOCUMENTS

| | | | | |
|---|---|---|---|---|
| 288,749 A * | 11/1883 | Way | | 24/505 |
| 2,397,438 A * | 3/1946 | Schmid | | 285/261 |
| 2,555,591 A * | 6/1951 | Kane, Jr | | 285/334.5 |
| 3,519,188 A * | 7/1970 | Erhardt, Jr | | 227/144 |
| 3,564,956 A * | 2/1971 | Landen | | 81/126 |
| 3,593,386 A * | 7/1971 | Hug | | 24/457 |
| 4,978,100 A * | 12/1990 | Peurifoy | | 251/8 |
| 5,291,914 A * | 3/1994 | Bares et al. | | 137/15.13 |
| 5,373,866 A * | 12/1994 | Whalen, II | | 137/318 |
| 7,077,177 B2 * | 7/2006 | Awad | | 141/330 |
| 2004/0107549 A1 * | 6/2004 | Lin | | 24/505 |

* cited by examiner

*Primary Examiner* — Patrick F Brinson

(57) ABSTRACT

An isolation device for oil circuit contains a first clamper and the second clamper which include a first clamping portion and a second clamping and two grip portions; the first clamping portion having a first plug and a notch; the second clamper being located at a recess of the notch, and the recess having a post extending upwardly, the post having a groove formed therein for inserting a fixing member, a disc, a compression spring, and a washer, the fixing member being received in the recess of the second clamper and having a plurality of ribs, the disc having a plurality of slots; the disc having a first cutout, a second cutout, and a third cutout provided in an array arrangement, wherein the first cutout, the second cutout, and the third cutout are in different sizes, and the disc also having a second plug in different sizes.

5 Claims, 14 Drawing Sheets

ISOLATION DEVICE FOR OIL CIRCUIT

FIELD OF THE INVENTION

The present invention relates to an isolation device, and more particularly to an isolation device for oil circuit which is applicable for different types and sizes of oil tubes based on using requirement.

BACKGROUND OF THE INVENTION

As shown in FIG. 1, a conventional isolation device 10 has plural bodies 11 used in different types clampers. The bodies 11 are in two types. For example, one type of body 11 includes a first clamper 12 and a second clamper 13, and the first clamper 12 has a first plug 12 fixed on an inner side of a front end thereof, and the second clamper 13 has a groove 15 defined in a front end thereof. Another type of body 11 includes a first clamper 12 and a second clamper 13, and the first clamper 12 and the second clamper 13 have two plugs 14.

In operation, as shown in FIGS. 2 and 3, when the isolation device 10 is applied in a first connector 21 of a single oil tube of an oil store member 20, the second clamper 13 of the groove 15 retains with a locking block 211 of the first connector 21, and a plug 14 of the first clamper 12 retains and covers the first connector 21. While the isolation device 10 is served in a second connector 22 of a two-way oil tube, the two plugs 14 of the first clamper 12 and the second clamper 13 retain and cover two openings of the second connector 22, thus insolating the oil circuit.

However, such a conventional isolation device is only applicable for single size of connector, so the user has to purchase various isolation devices based on using requirement, thus increasing using cost.

The present invention has arisen to mitigate and/or obviate the afore-described disadvantages.

SUMMARY OF THE INVENTION

The primary object of the present invention is to provide an isolation device for oil circuit which is applicable for different types and sizes of oil tubes based on using requirement.

To obtain the above objectives, an isolation device for oil circuit contains:

a first clamper, a second clamper, and a resilient element;

the first clamper and the second clamper including a first clamping portion and a second clamping portion formed on two front ends thereof and two grip portions arranged on two rear ends thereof;

the first clamping portion of the first clamper having a first plug disposed on an inner side of a front end thereof, and the second clamping portion of the second clamper having a notch defined on a front end thereof;

the second clamper being located at a recess of an inner side of a rear end of the notch, and the recess having a post extending upwardly, the post having a groove formed therein for inserting a fixing member, a disc, a compression spring, and a washer, wherein the fixing member has a first hole, a second hole, and a third hole, the fixing member, the disc, the compression spring, and the washer are connected with the groove by ways of a screwing element;

the fixing member being received in the recess of the second clamper and having a plurality of ribs mounted on a top end thereof, the disc having a plurality of slots defined on a bottom end thereof and corresponding to the plurality of ribs;

the disc having a first cutout, a second cutout, and a third cutout provided in an array arrangement, wherein the first cutout, the second cutout, and the third cutout are in different sizes, and the disc also having a second plug retained thereon, and the second plug having different sizes.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
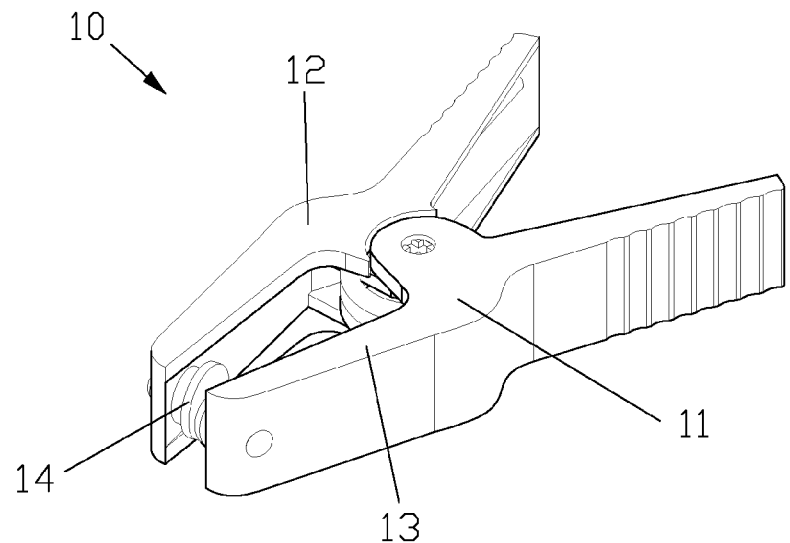
FIG. 1 is a perspective view of the assembly of a conventional isolation device for oil circuit.
Figure 1:
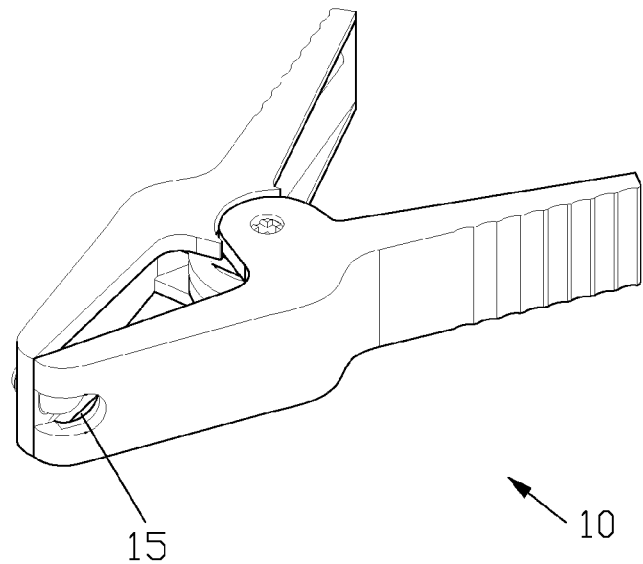
Figure 2:
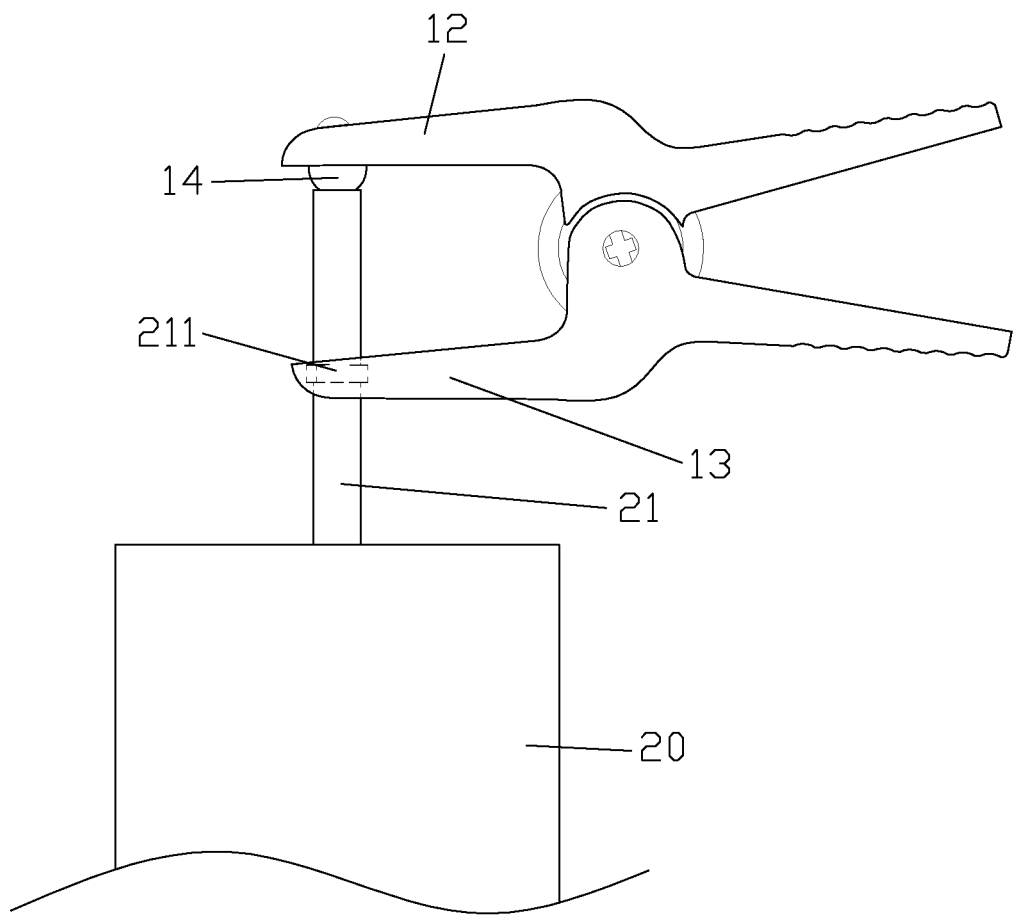
FIG. 2 is a plan view of the operation of the conventional isolation device for the oil circuit.
Figure 3:
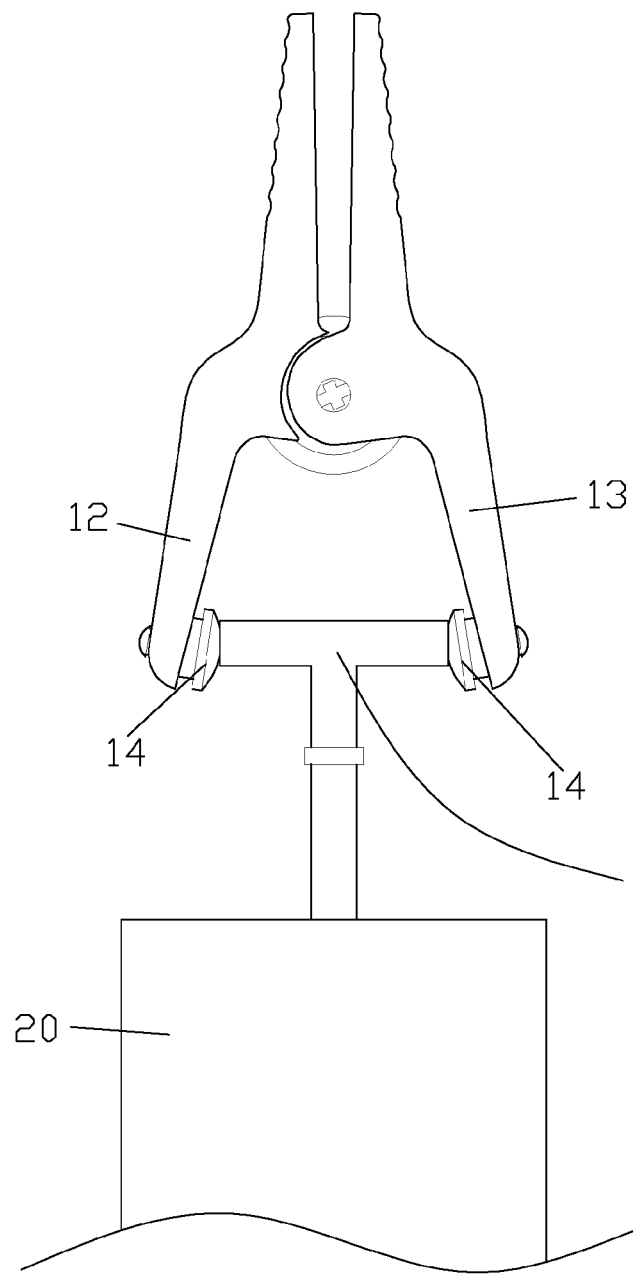
FIG. 3 is another plan view of the operation of the conventional isolation device for the oil circuit.
Figure 4:
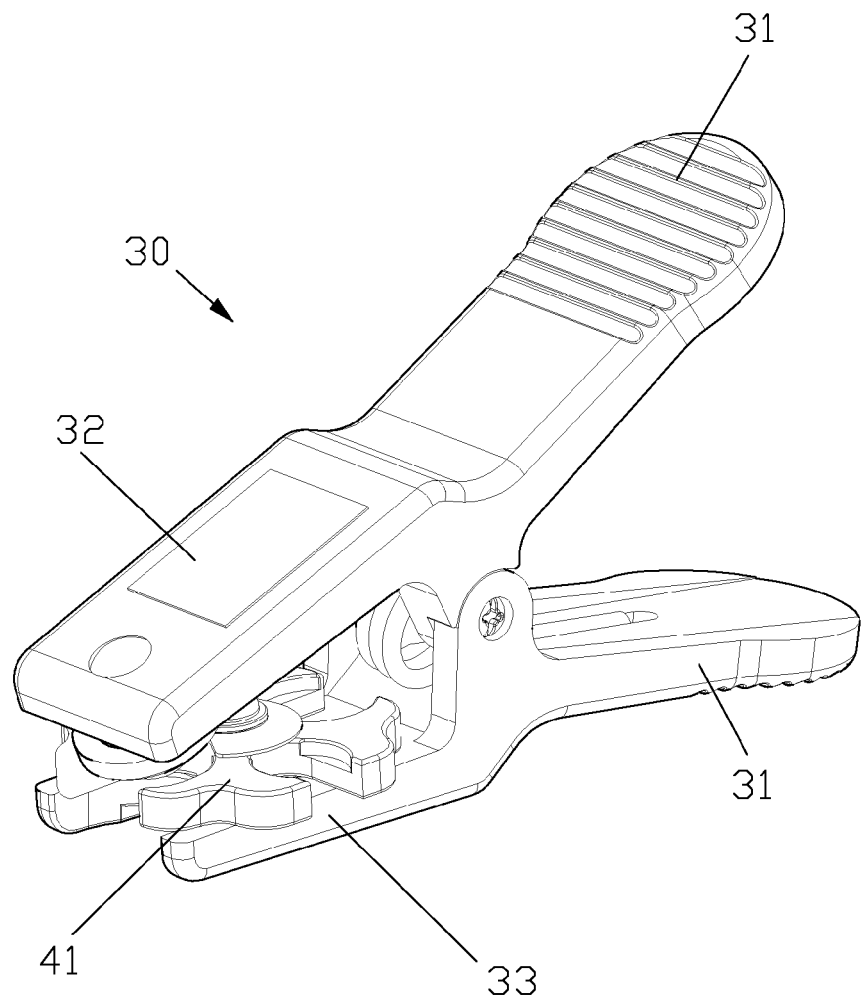
FIG. 4 is a perspective view of the assembly of an isolation device for oil circuit according to a preferred embodiment of the present invention.
Figure 5:
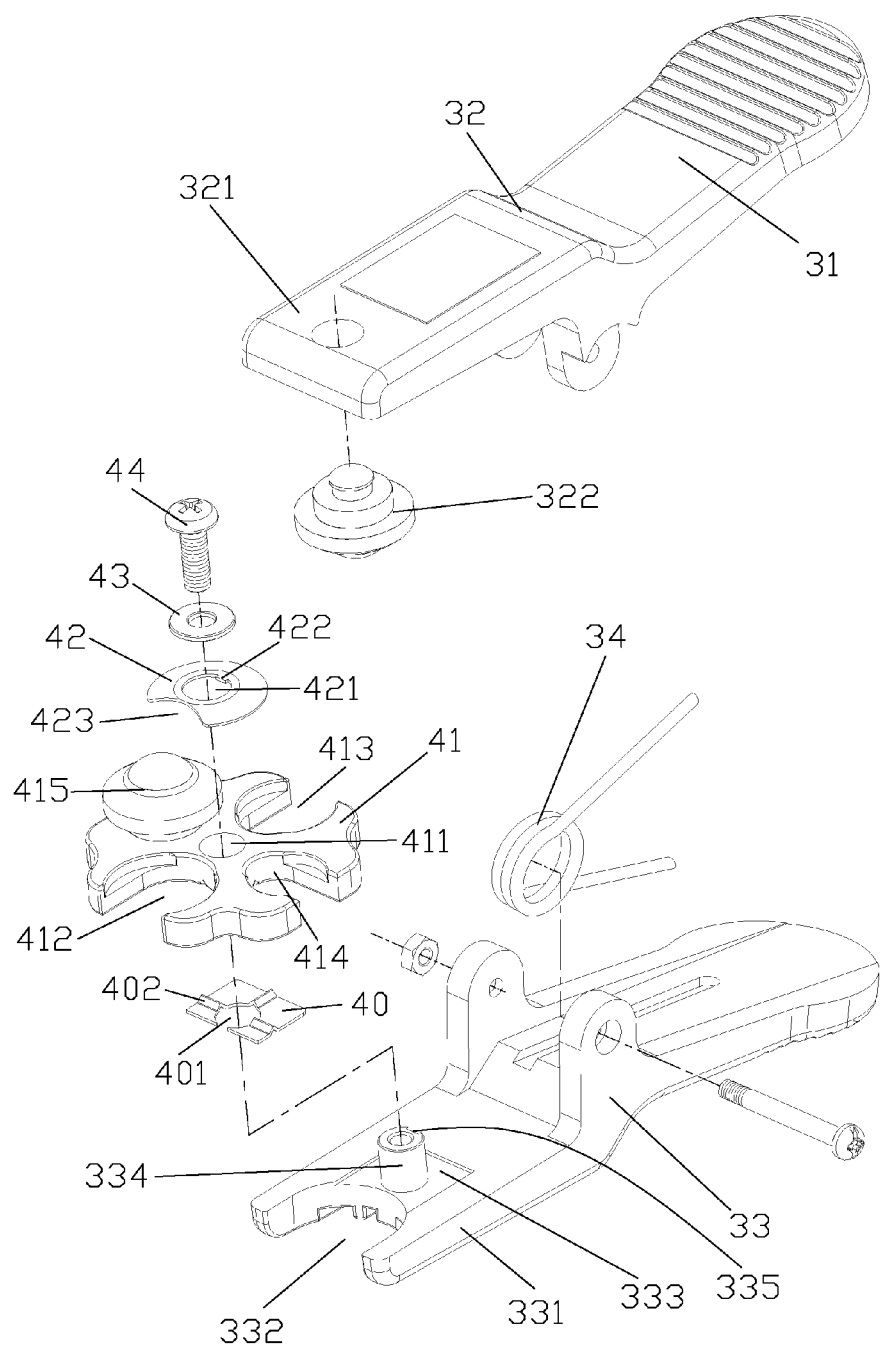
FIG. 5 is a perspective view of the exploded components of the isolation device for the oil circuit according to the preferred embodiment of the present invention.
Figure 6:
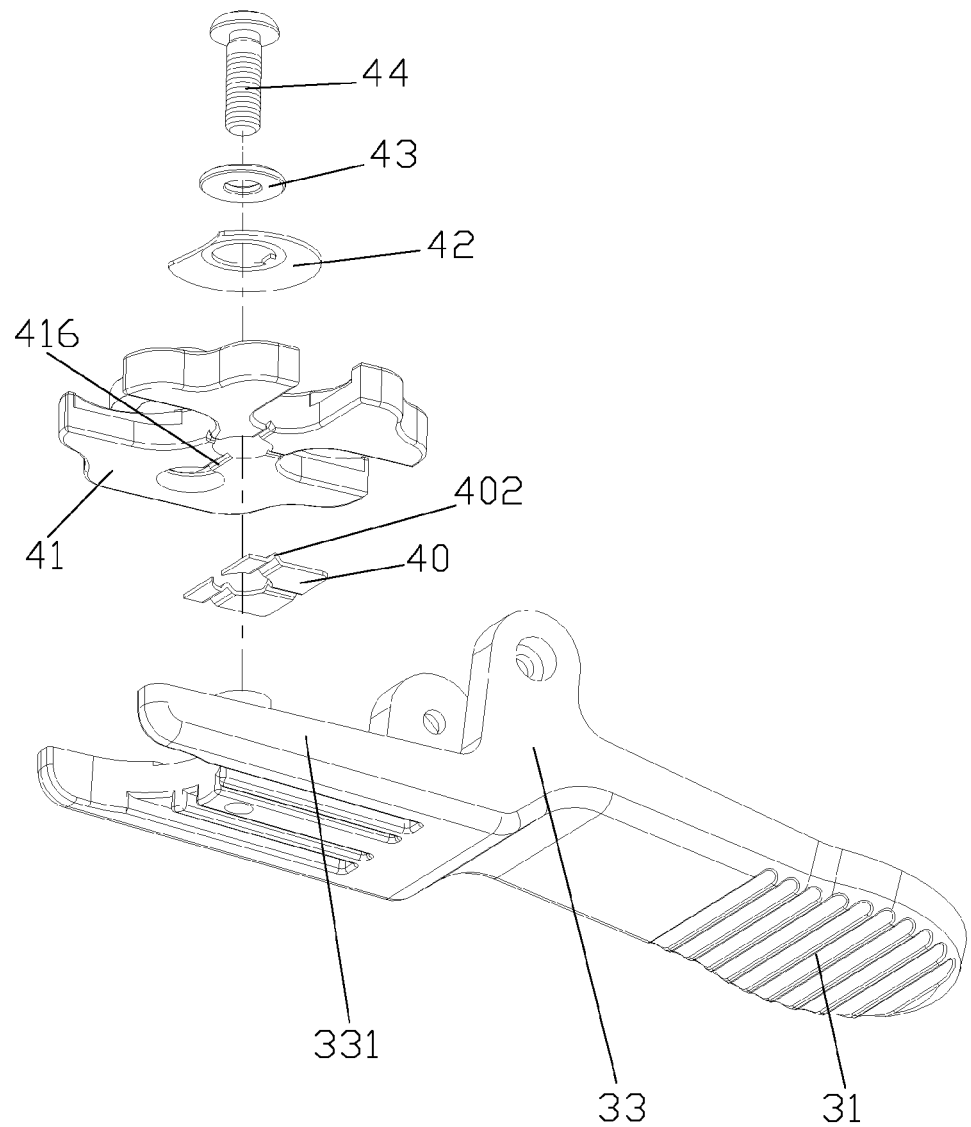
FIG. 6 is a perspective view showing the exploded components of a second clamper of the isolation device for the oil circuit according to the preferred embodiment of the present invention.
Figure 7:
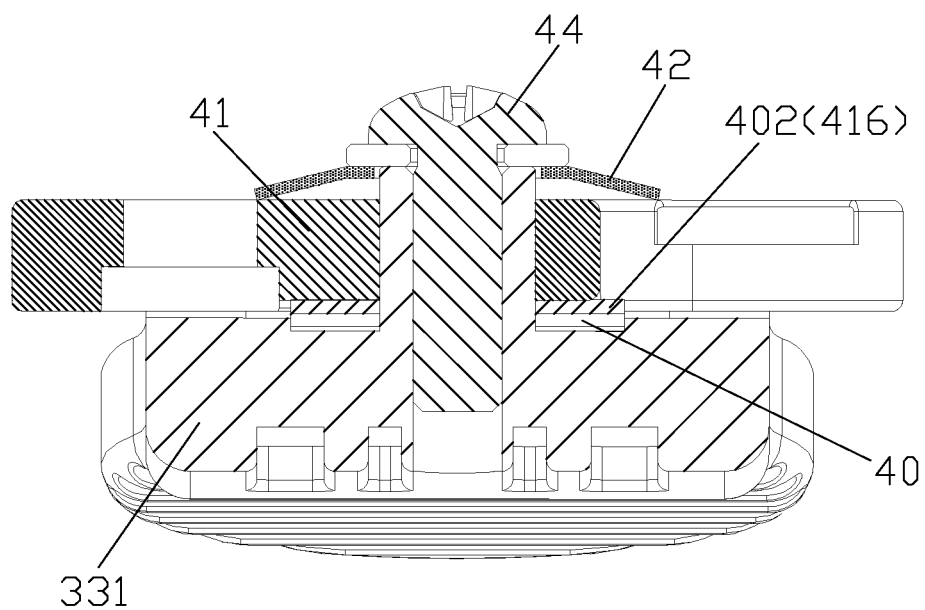
FIG. 7 is a cross sectional view showing the assembly of a disc and a fixing member of the isolation device for the oil circuit according to the preferred embodiment of the present invention.
Figure 8:
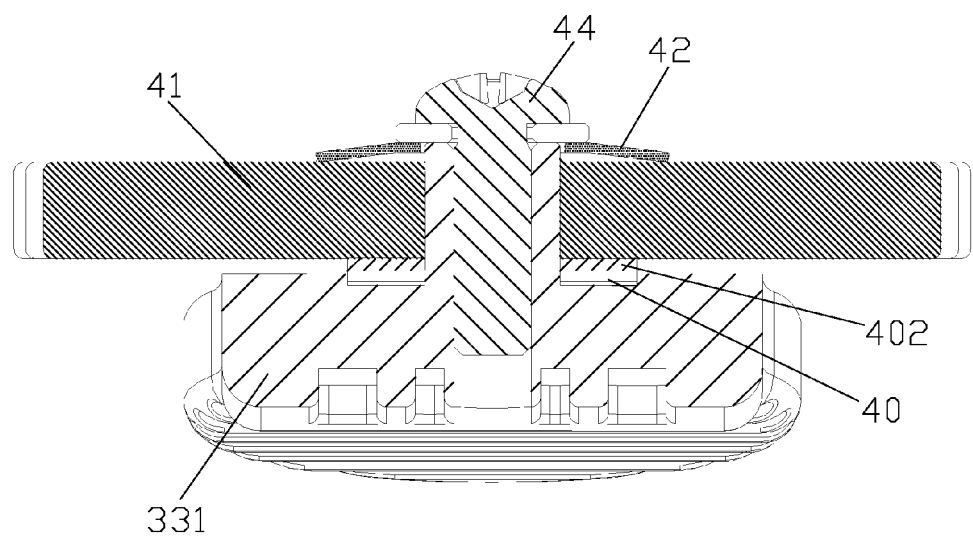
FIG. 8 is another cross sectional view showing the assembly of the disc and the fixing member of the isolation device for the oil circuit according to the preferred embodiment of the present invention.

Referring to FIGS. 4-6, an isolation device 30 according to a preferred embodiment of the present invention comprises: a first clamper 32, a second clamper 33, and a resilient element 34. The first clamper 32 and the second clamper 33 include a first clamping portion 321 and a second clamping portion 331 formed on two front ends thereof and two grip portions 31 arranged on two rear ends thereof. The first clamping portion 321 of the first clamper 32 has a first plug 322 disposed on an inner side of a front end thereof, and the second clamping portion 331 of the second clamper 33 has a notch 332 defined on a front end thereof.

The second clamper 33 also includes a recess 333 defined on an inner side of a rear end of the notch 332, and the recess 333 has a post 334 extending upwardly, the post 334 is used to insert a first hole 401 of a fixing member 40, a second hole 411 of a disc 41, a third hole 421 of a compression spring 42 and a washer 43 and has a groove 335 formed therein. In addition, the fixing member 40, the disc 41, the compression spring 42, and the washer 43 are connected with the groove 335 by ways of a screwing element 44. The fixing member 40 is received in the recess 333 of the second clamper 33 and has a plurality of ribs 402 mounted on a top end thereof. The disc 41 has a plurality of slots 416 defined on a bottom end thereof and corresponding to the plurality of ribs 402. The third hole 421 of the compression spring 42 has a retaining tab 422 arranged therein for retaining with the groove 335 of the post 334 so as to limit the compression spring 42, hence a recessed portion 423 of the compression spring 42 is positioned on a front end of the second clamper 33.

As shown in FIGS. 5-8, the disc 41 has a first cutout 412, a second cutout 413, and a third cutout 414 provided in an array arrangement, wherein the first cutout 412, the second cutout 413, and the third cutout 414 are in different sizes. The disc 41 also has a second plug 415 retained thereon, and the second plug 415 has different sizes. When the disc 41 rotates, it is pushed by the plurality of ribs 402 of the fixing member 40 and then pushes the compression spring 42, such that as the disc 41 is positioned, the plurality of slots 416 of the disc 41 retain with the plurality of ribs 402 and are pressed by the compression spring 42, thus positioning the disc securely. Furthermore, when the disc 41 is positioned, one of the first cutout 412, the second cutout 413, and the third cutout 414 or the second plug 415 is fixed in the notch 332 of the second clamper 33 so as to form a vertical position.

Figure 9:
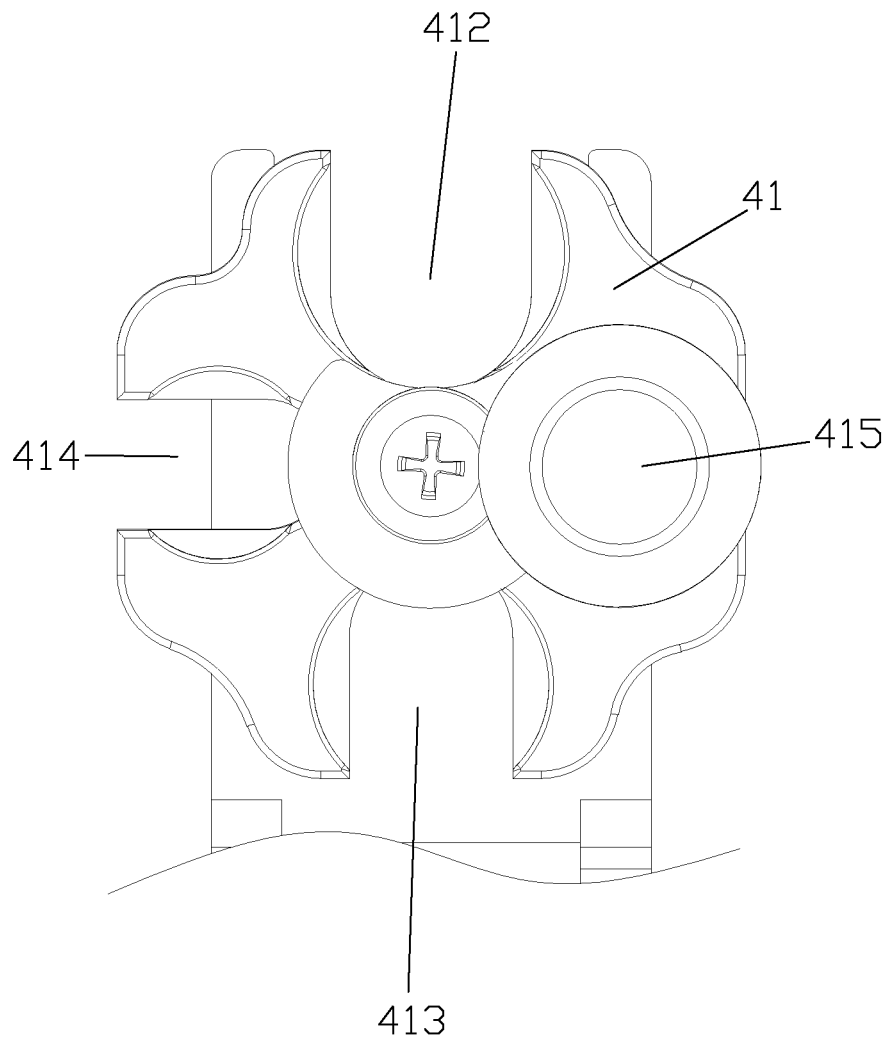
FIG. 9 is a plan view showing the operation of the disc of the isolation device for the oil circuit according to the preferred embodiment of the present invention.
Figure 10:
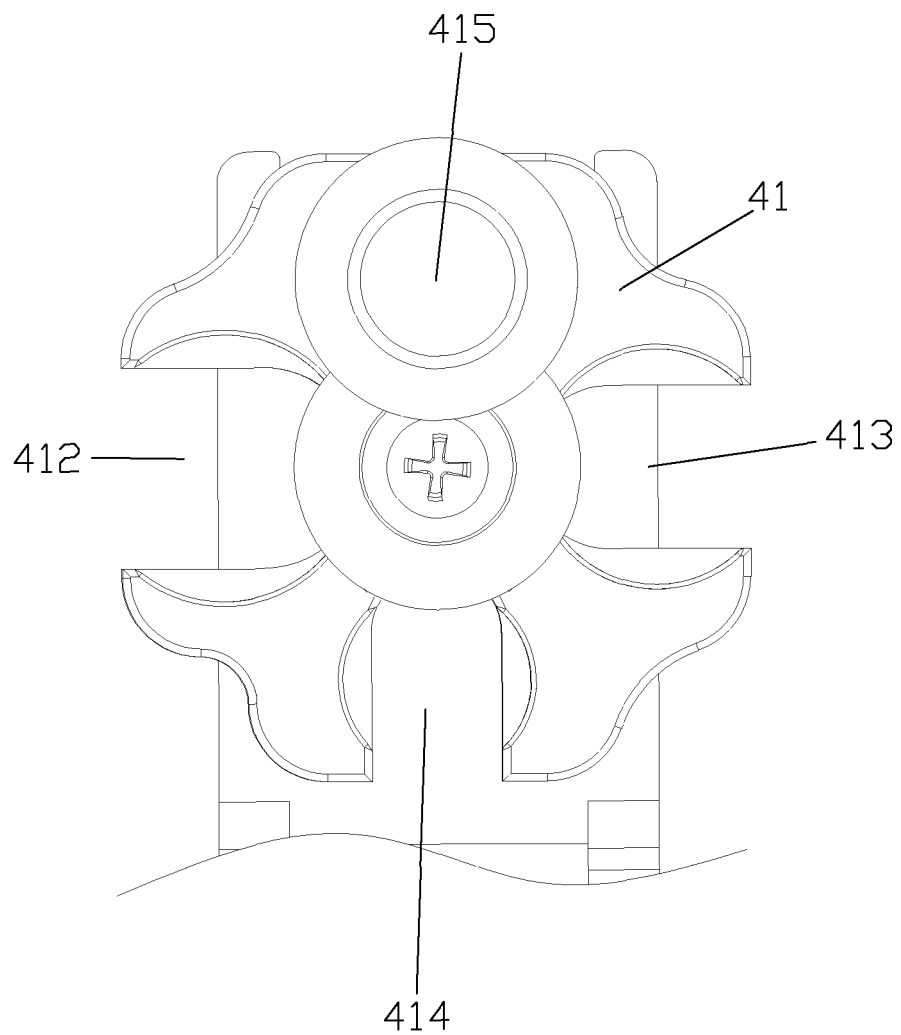
FIG. 10 is another plan view showing the operation of the disc of the isolation device for the oil circuit according to the preferred embodiment of the present invention.
Figure 11:
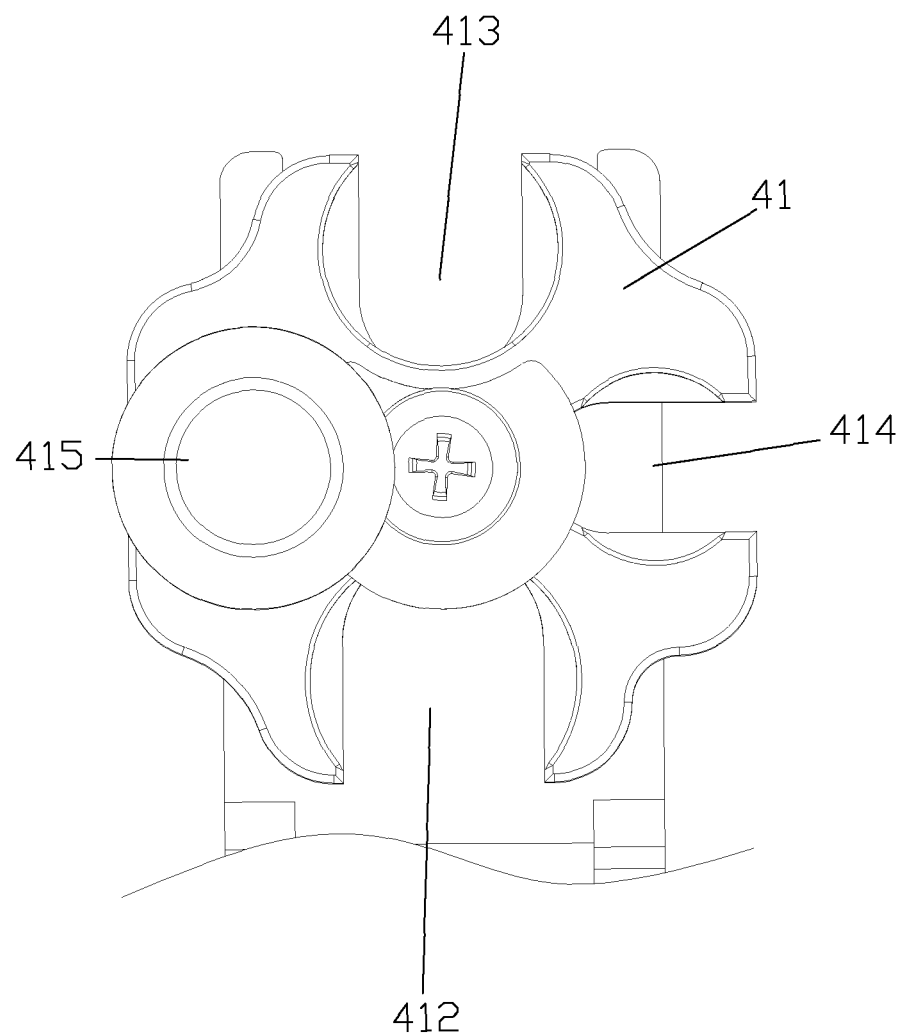
FIG. 11 is also another plan view showing the operation of the disc of the isolation device for the oil circuit according to the preferred embodiment of the present invention.
Figure 12:
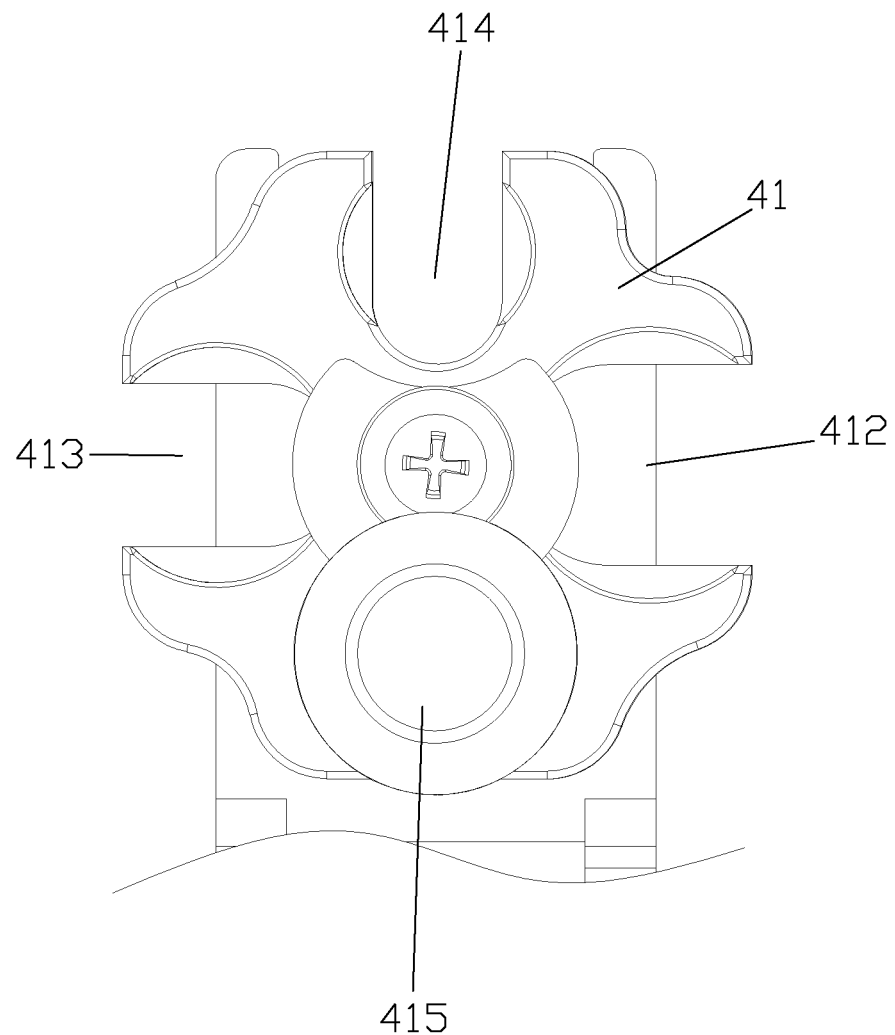
FIG. 12 is still another plan view showing the operation of the disc of the isolation device for the oil circuit according to the preferred embodiment of the present invention.

With reference to FIGS. 9-11, when the disc 41 is rotated, the second plug 415, having a size for matching with a size of the first cutout 412, the second cutout 413, or the third cutout, is inserted into the first cutout 412, the second cutout 413, or the third cutout 414. Moreover, the recessed portion 423 of the compression spring 42 is formed to match with the first cutout 412, the second cutout 413, and the third cutout 414.

The compression spring 42 has a diameter smaller than those of the first cutout 412, the second cutout 413, and the third cutout 414 so that the compression spring 42 does not cover the first cutout 412, the second cutout 413, and the third cutout 414 completely.

Figure 13:
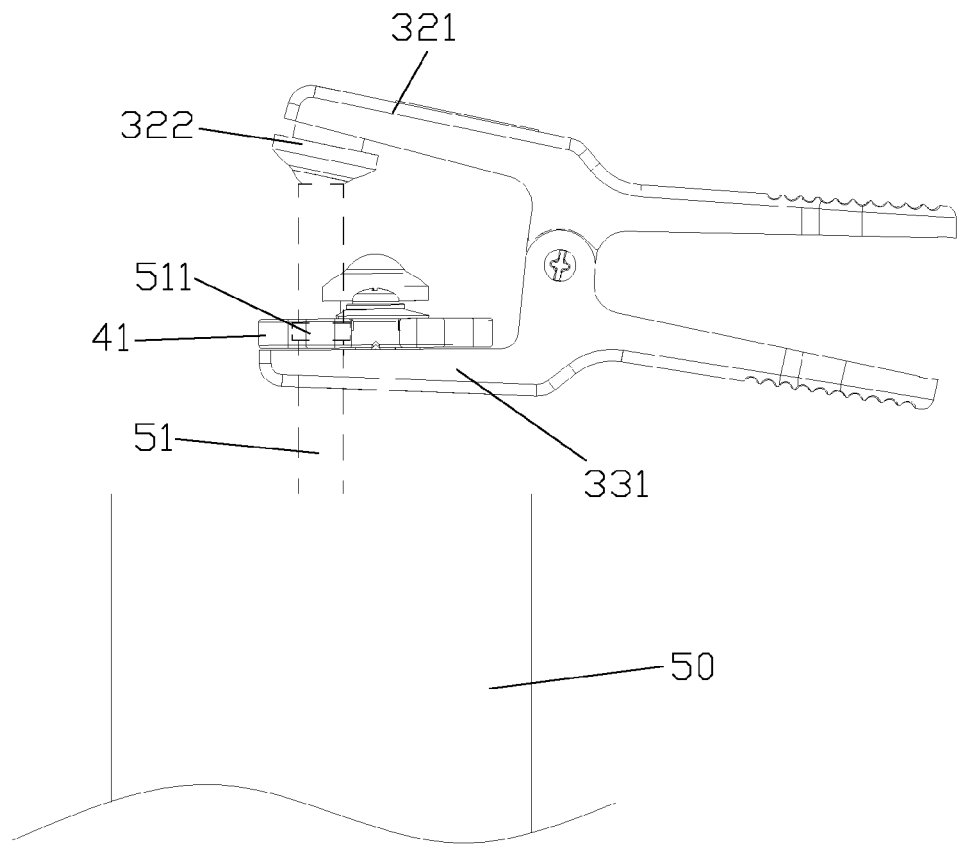
FIG. 13 is a plan view showing the operation of the isolation device for the oil circuit according to the preferred embodiment of the present invention.
Figure 14:
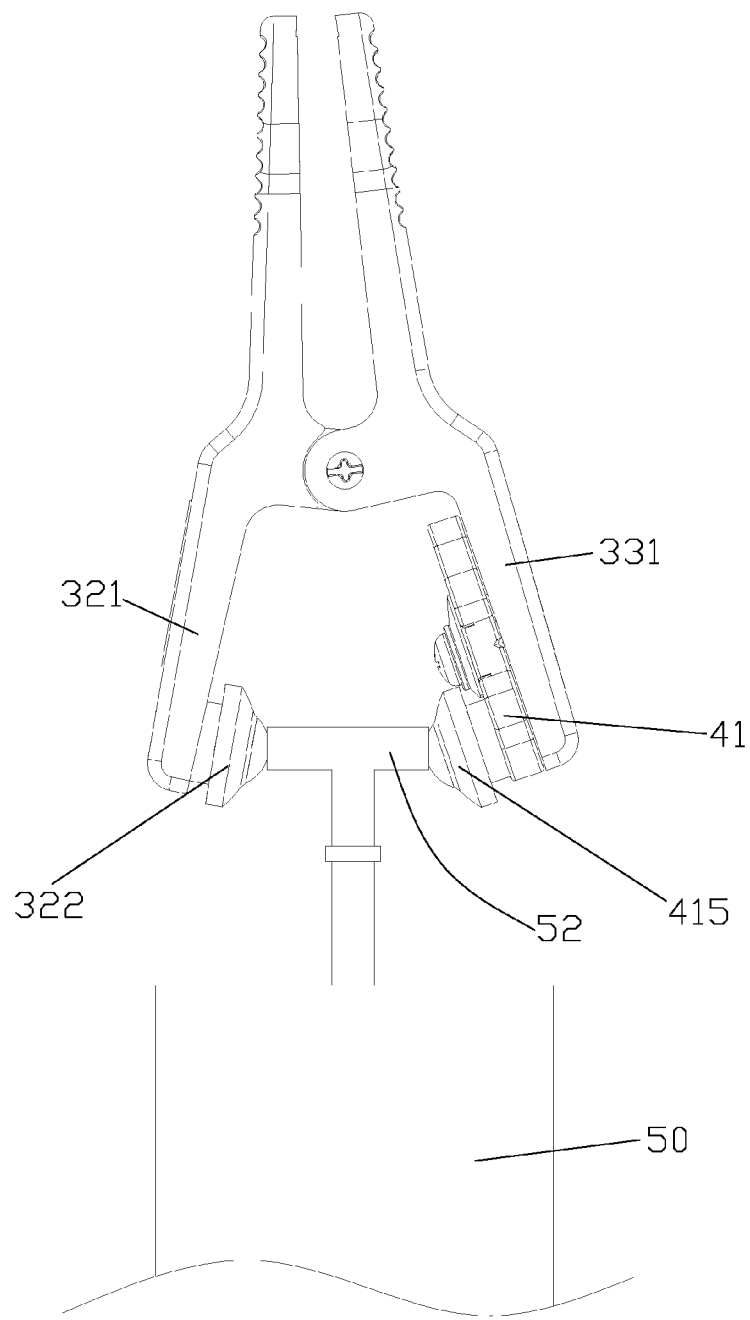
FIG. 14 is another plan view showing the operation of the isolation device for the oil circuit according to the preferred embodiment of the present invention.

As illustrated in FIGS. 13 and 14, when desiring to isolate a first connector 51 of a single oil tube of an oil storage member 50, the disc 41 is adjusted so that a size of the first connector 51 matches with the first cutout 412, the second cutout 413, and the third cutout 414, such that the first cutout 412, the second cutout 413, and the third cutout 414 suitable for the first connector are retained with a locking block 511 of the first connector 51, and an opening of the first connector 51 is plugged by the first plug 322 of the first clamper 32. Thereafter, as the isolation device 30 is used in a second connector 52 of a two-way oil tube, the second plug 415 of the disc 41 is rotated toward the notch 332 so that the first plug 322 and the second plug 415 of the first clamper 32 and the second clamper 33 clamp and close two openings of the second connector 52.

Thereby, the isolation device of the present invention is applicable for different types and sizes of oil tubes based on using requirement.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An isolation device for oil circuit comprising:
a first clamper, a second clamper, and a resilient element;
the first clamper and the second clamper including a first clamping portion and a second clamping portion formed on two front ends thereof and two grip portions arranged on two rear ends thereof;
the first clamping portion of the first clamper having a first plug disposed on an inner side of a front end thereof, and the second clamping portion of the second clamper having a notch defined on a front end thereof;
the second clamper also including a recess defined on an inner side of a rear end of the notch, and the recess having a post extending upwardly, the post being used to insert a first hole of a fixing member, a second hole of a disc, a third hole of a compression spring and a washer and having a groove formed therein, wherein the fixing member, the disc, the compression spring, and the washer are connected with the groove by ways of a screwing element;
the fixing member being received in the recess of the second clamper and having a plurality of ribs mounted on a top end thereof, the disc having a plurality of slots defined on a bottom end thereof and corresponding to the plurality of ribs;
the disc having a first cutout, a second cutout, and a third cutout provided in an array arrangement, wherein the first cutout, the second cutout, and the third cutout are in different sizes, and the disc also having a second plug retained thereon, and the second plug having a varying diameter for matching with a size of each cutout.

2. The isolation device for the oil circuit as claimed in claim 1, wherein when the disc rotates, it is pushed by the plurality of ribs of the fixing member and then pushes the compression spring, such that as the disc is positioned, the plurality of slots of the disc retain with the plurality of ribs and are pressed by the compression spring.

3. The isolation device for the oil circuit as claimed in claim 1, wherein when the disc is positioned, one of the first cutout, the second cutout, and the third cutout or the second plug is fixed in the notch of the second clamper so as to form a vertical position.

4. The isolation device for the oil circuit as claimed in claim 1, wherein the third hole of the compression spring has a retaining tab arranged therein for retaining with the groove of the post so as to limit the compression spring, hence a recessed portion of the compression spring is positioned on a front end of the second clamper.

5. The isolation device for the oil circuit as claimed in claim 1, wherein the compression spring has a diameter smaller than those of the first cutout, the second cutout, and the third cutout so that the compression spring does not cover the first cutout, the second cutout, and the third cutout completely.

* * * * *